(12) United States Patent
Aryal

(10) Patent No.: US 11,276,389 B1
(45) Date of Patent: Mar. 15, 2022

(54) PERSONALIZING A DNN-BASED TEXT-TO-SPEECH SYSTEM USING SMALL TARGET SPEECH CORPUS

(71) Applicant: Sandesh Aryal, Kathmandu (NP)

(72) Inventor: Sandesh Aryal, Kathmandu (NP)

(73) Assignee: OBEN, INC., Pasadena, CA (US)

( * ) Notice: Subject to any disclaimer, the term of this patent is extended or adjusted under 35 U.S.C. 154(b) by 0 days.

(21) Appl. No.: 16/700,654

(22) Filed: Dec. 2, 2019

Related U.S. Application Data

(60) Provisional application No. 62/774,065, filed on Nov. 30, 2018.

(51) Int. Cl.
| G10L 13/02 | (2013.01) |
| G10L 15/16 | (2006.01) |
| G10L 15/02 | (2006.01) |
| G10L 25/18 | (2013.01) |
| G10L 25/90 | (2013.01) |

(52) U.S. Cl.
CPC .............. *G10L 13/02* (2013.01); *G10L 15/02* (2013.01); *G10L 15/16* (2013.01); *G10L 25/18* (2013.01); *G10L 25/90* (2013.01); *G10L 2015/025* (2013.01); *G10L 2015/027* (2013.01)

(58) Field of Classification Search
CPC ......... G10L 13/02; G10L 15/02; G10L 15/16; G10L 25/18; G10L 25/90
See application file for complete search history.

(56) References Cited

U.S. PATENT DOCUMENTS

2019/0019500 A1* 1/2019 Jang ...................... G10L 15/063

* cited by examiner

*Primary Examiner* — Paras D Shah
*Assistant Examiner* — Darioush Agahi
(74) *Attorney, Agent, or Firm* — Andrew S. Naglestad

(57) ABSTRACT

A personalized text-to-speech system configured to perform speaker adaption is disclosed. The TTS system includes an acoustic model comprising a base neural network and a differential neural network. The base neural network is configured to generate acoustic parameters corresponding to a base speaker or voice actor, while the differential neural network is configured to generate acoustic parameters corresponding to differences between acoustic parameters of the base speaker and a particular target speaker. The output of the acoustic model is then a weighted linear combination of the output from the base neural network and differential neural network. The base neural network and differential neural network share a first input layer and first plurality of hidden layers. Thereafter, the base neural network further comprises a second plurality of hidden layers and output layer. In parallel, the differential neural network further comprises a third plurality of hidden layers and separate output layer.

7 Claims, 3 Drawing Sheets

PERSONALIZING A DNN-BASED TEXT-TO-SPEECH SYSTEM USING SMALL TARGET SPEECH CORPUS

CROSS-REFERENCE TO RELATED APPLICATION(S)

This application claims the benefit of U.S. Provisional Patent Application Ser. No. 62/774,065 filed Nov. 30, 2018, titled "Personalizing a DNN-based text-to-speech system using few minutes of target speech," which is hereby incorporated by reference herein for all purposes.

TECHNICAL FIELD

In general, the invention relates to a text-to-speech system. In particular, the invention relates to a system and method for converting text to speech where that speech is based on a target speaker and generic speaker.

BACKGROUND

Some contemporary text-to-speech (TTS) systems use a deep neural network to estimate acoustic parameters 140 of speech 110 for a given sentence, as illustrated in FIG. 1. These systems include a feed forward deep neural network, also known as acoustic model, comprising an input layer 150, plurality of hidden layers 160, and output layer 170. The deep neural network is configured and trained to estimate Mel cepstral coefficients, aperiodicity parameters, and pitch for each timepoint at 5 millisecond intervals, also referred to as "frames". Each estimate is based on a linguistic feature vector 130 at each frame of a sentence. Linguistic feature vectors include a numerical representation of phoneme identity, phonetic context 120, parts of speech of the word, position of the phoneme within syllable, word etc., and relative position of the frame within the phoneme. A separate duration model is trained to estimate the temporal length of each phoneme in the sentence from its linguistic features.

Personalization of TTS synthesis seeks to modify the synthesized speech from a given TTS system to sound like a target speaker using only a few short utterances from that speaker. Current systems for personalization of TTS require considerable data in order to adapt the TTS to produce speech that resembles the target speaker. There is therefore a need for a system and method of producing personalized TTS with minimal target speaker data.

SUMMARY

The preferred embodiment of the present invention is a text-to-speech system with speaker adaptation, i.e., SATTS system. The SATTS system includes an acoustic model. The acoustic model preferably comprises a base neural network, a differential neural network, and a summing circuit configured to generate a weighted linear combination with outputs of the base neural network and differential neural network. The base neural network comprises a first input layer, a first plurality of hidden layers, a second plurality of hidden layers, and a first output layer. The differential neural network comprises the same first input layer, the same first plurality of hidden layers, a third plurality of hidden layers, and a second output layer. The base neural network is configured to generate acoustic parameters corresponding to a base speaker, and the differential neural network is configured to generate acoustic parameters corresponding to differences between acoustic parameters of the base speaker and a target speaker.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
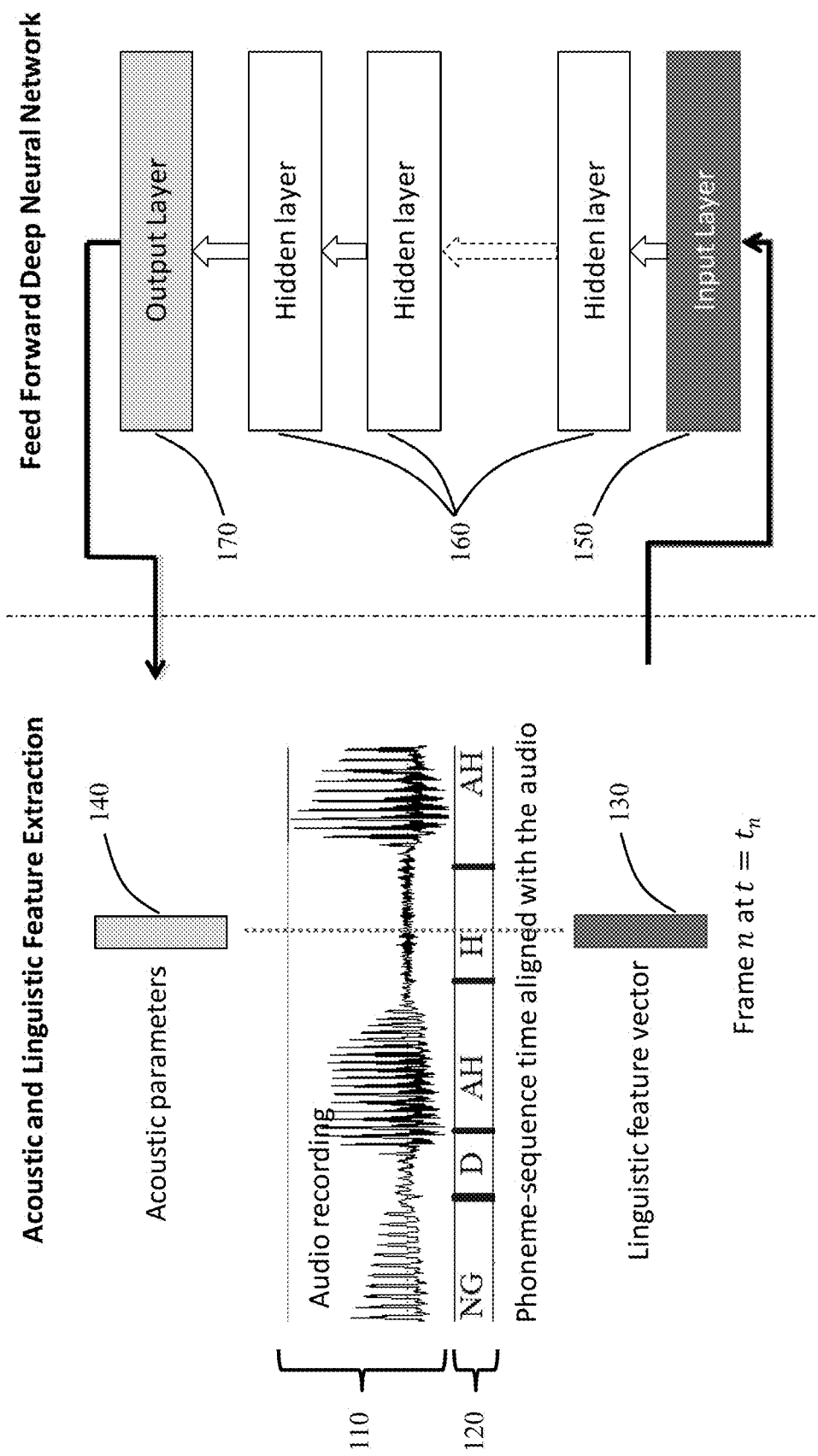
FIG. 1 is a diagrammatic illustration showing a contemporary acoustic model, in accordance with the preferred embodiment of the present invention.
Figure 2:
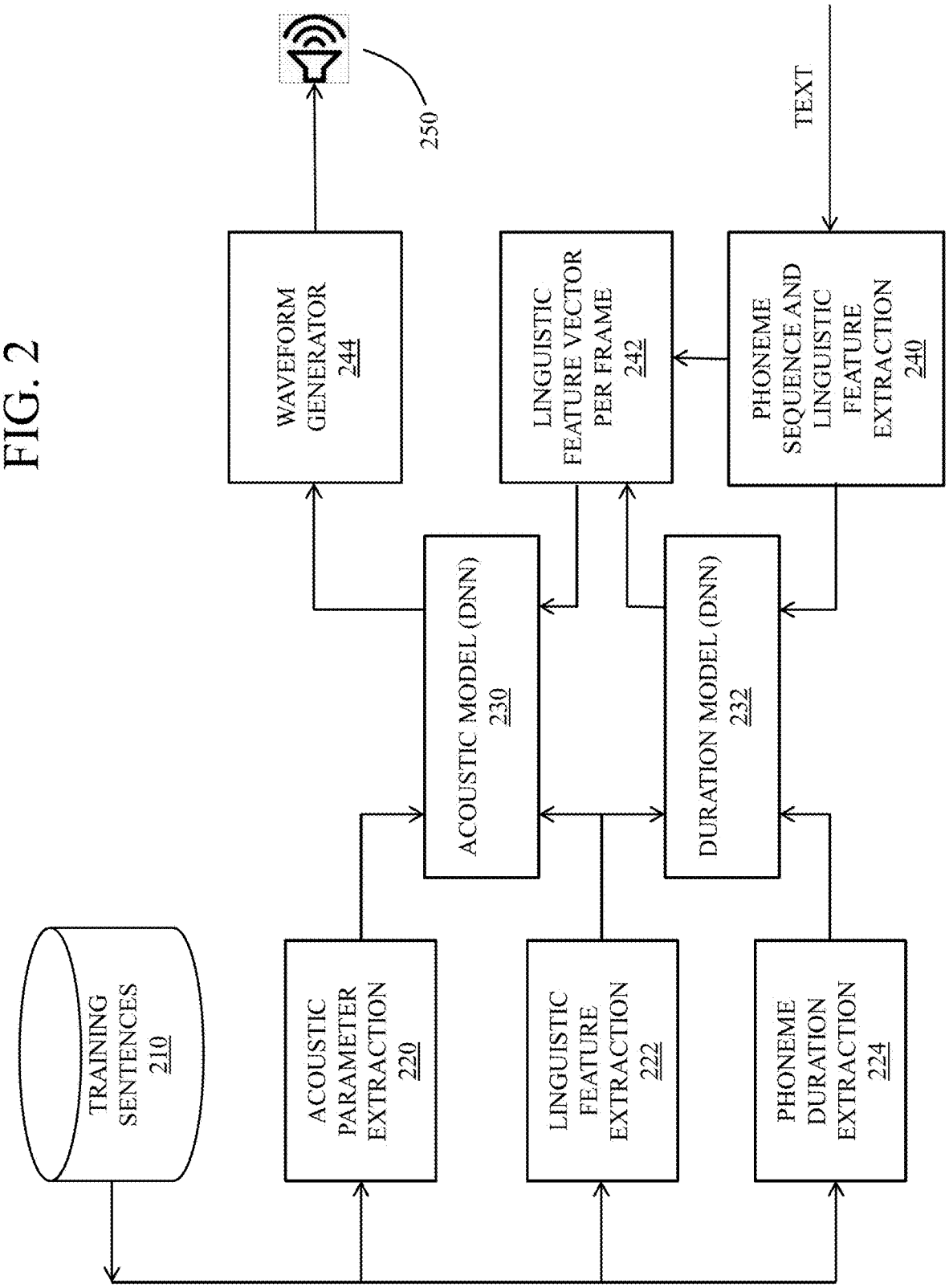
FIG. 2 is a functional block diagram of a speaker adaptation text-to-speech system, in accordance with the preferred embodiment of the present invention.

The preferred embodiment of the present invention is a text-to-speech (TTS) system with speaker adaptation. The speaker adaptation TTS (SATTS) system in the preferred embodiment is configured to generate speech from text where the speech has the properties of a select target speaker. Referring to FIG. 2, the SATTS system includes a: database 210 with training sentences from the target speaker, module 220 for performing acoustic parameter extraction, module 222 for performing linguistic feature extraction, module 224 for performing phoneme duration extraction, acoustic model 230 including a multi-path deep neural network in accordance with the present invention, duration module 232 configured to generate the duration of phonemes, module 240 for performing phoneme sequence and linguistic feature extraction, module 242 for generating a linguistic feature vector, waveform generator 244, and speaker 250.

Database 210 comprises utterances recorded from a plurality of speakers along with the corresponding text. The utterances are used to train a base neural network as well as a target speaker neural network adapted to a target speaker. For training a base neural network, the database 210 contains several hours (typically 10-15 hours) of speech from a voice actor recorded in a studio. The voice actor is referred to herein as the base speaker. For each target voice, the database 210 contains a few minutes of speech from one or more target speakers along with the transcription of that speech.

The acoustic parameter extraction module 220 is configured to extract acoustic parameters—spectral features, pitch, energy, band aperiodicity, etc.—from audio signal depending on the vocoder used. The most common vocoder used in TTS is called World. In this case, the World feature extraction tool is used to compute mel-cepstral coefficients, fundamental frequency and band aperiodicity parameters from an audio signal. Typically, these parameters are extracted at time points spaced apart in accordance with a time interval of about 5 milliseconds. These time points are sometimes referred to as frames in TTS.

The linguistic feature extraction module 222 is configured to extract phoneme level linguistic feature vectors from a given transcription. These features include phoneme identity, articulatory attributes of the phoneme, the phoneme's position within the syllable, word and phrase etc. These features are directly used in training the duration model 232. When used as a predictor for acoustic model 230, a subprocess converts phoneme-level feature vectors into frame-level feature vectors. To this end, each phoneme-level feature vector is replicated to match the number of acoustic frames in that phoneme, augmented by indicators that represent the position of a frame within the phoneme. The number of frames in a phoneme is given by the phoneme-level alignment of the speech in the training database 210.

The linguistic feature vector module 224 is configured to extract the duration of each phoneme in an utterance for purposes of training the duration model 232. Speech recognition systems are typically used to automatically align the phoneme sequence in the transcript with the corresponding speech signal.

Module 240 is a subprocess of the linguistic feature extraction module 222. Module 240 is configured to generate phoneme level linguistic feature vectors corresponding to a given input sentence.

Module 242 is another subprocess of the linguistic feature vector module 222. It is the subprocess that converts each phoneme-level linguistic feature vector into one or more frame-level linguistic feature vectors using the phoneme duration, namely the estimated duration in this case.

The waveform generator 244 generates an audio file for playback on a speaker 250. The audio file is generated from estimates of the acoustic parameters provided directly from the acoustic module 230. A World vocoder is typically used as the waveform generator.

After training, the duration module 232 and acoustic model 230 together produce the acoustic parameters of speech representing the speech of the target speaker. To start, text representing one or more input sentences is provided to module 240 which outputs phoneme-level linguistic feature vectors, each vector corresponding to one phoneme. The phoneme-level linguistic feature vectors are provided as input to the duration model 232 which outputs the duration of each phoneme to module 242. Module 242 converts the phoneme-level linguistic feature vector into one or more frame-level linguistic feature vectors, i.e., one or more frames representing the phoneme over the estimated duration of the phoneme. The acoustic model 230 then converts the frame-level linguistic feature vectors into acoustic feature vectors. The acoustic feature vectors include acoustic parameters including a set of spectra, pitch, and band aperiodicity features from which the speech waveform is generated. The resulting speech sounds as though spoken by the target speaker but is effectively based on speech from the base speaker in order to reduce the requirement for target speaker training speech.

The present invention employs an acoustic model 230 with a specialized target speech neural network trained to learn the difference between the normalized acoustic parameters corresponding to the base speaker and target speaker. The specialized target speech neural network, referred to herein as the "differential" neural network, is used along with a conventional "base" neural network trained on the base speaker's speech. Together, the base neural network and differential neural network are used to generate target speech a given target speaker with minimal training data.

Figure 3:
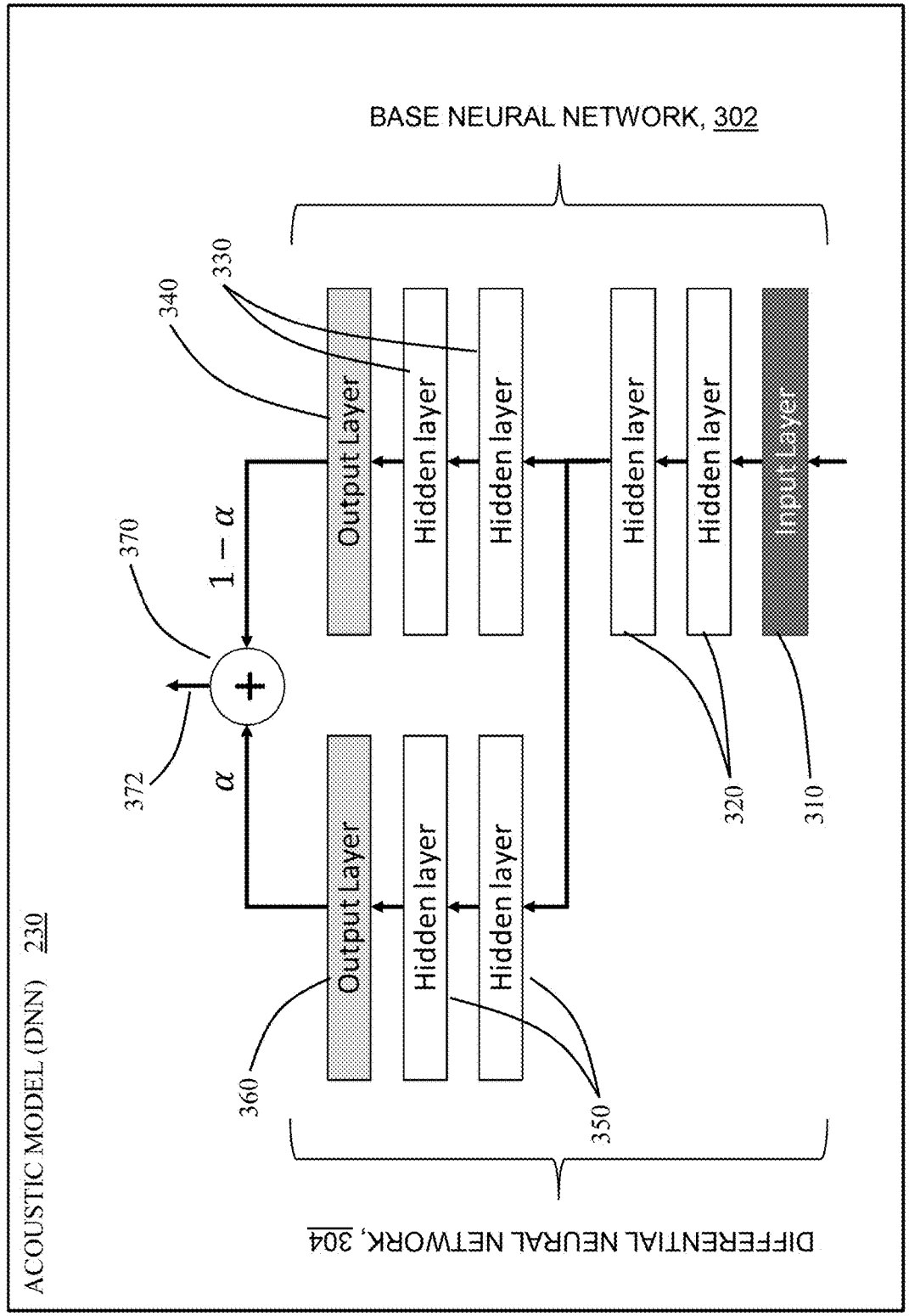
FIG. 3 is a functional block diagram of the combination base DNN and differential DNN, in accordance with the preferred embodiment of the present invention.

Illustrated in FIG. 3 is a functional block diagram of the acoustic model 230 in the preferred embodiment. The acoustic model 230 includes, to the right, a base neural network 302 path and, to the left, a specialized differential neural network 304 path trained to learn the difference between the normalized acoustic parameters estimated by the base speaker and those of the target speaker. A weighting mechanism 370 is included to control generalizability of the model based on the amount and the quality of data available from target speaker.

Referring to FIG. 3, the base neural network 302 path includes an input layer 310, a plurality of hidden layers including a first set of hidden layers 320 and a second set of hidden layers 330, and an output layer 340. The differential neural network 304 path includes the same input layer 310, same first set of hidden layers 320, a third set of hidden layers 350, and an output layer 360. The summing circuit 370 then applies weights to the output layer 340 of the base neural network path and the output layer 360 of the differential neural network path before summing them up.

Typically, the base neural network 302 path is a feed forward network consisting of input and output layer with 8 hidden layers of 1024 nodes each.

The differential neural network 304 path is illustrated in FIG. 3 as a branch off the base neural network 302 path. In the preferred embodiment, the differential neural network 304 shares the input layer 310 and first two hidden layers 320 with the base neural network 302 path before branching off. After branching off, the differential neural network 304 path further includes a third set comprising two hidden layers 350 an output layer 360 separate from the output layer 340 of the base neural network 302 path. The differential neural network path typically replicates the top half of the network, namely the second set of hidden layers 330 and output layer 340.

The final output 372 of the acoustic model 230 is the weighted sum of the output from the final layers of the two branches, namely output layer 340 and output layer 360. The weighing factor $\alpha$ for the new trainable branch is preferably set to be higher than 0.5. For a target speaker corpus size of 1-10 minutes, typical value of a is 0.8. Based on the quality and quantity of the speech data from the target speaker, the weighting factor can be adjusted for best performance.

In the initial training phase, a speech corpus consisting of audio and the corresponding text aligned to the audio at phoneme level is first used to train the duration model 232 as well as the base neural network 302 path of the acoustic model 230, similar to contemporary TTS systems. When training the base neural network 302 path, a is set to 0.0 so that the differential neural network 304 path is completely ignored.

After the training of the base neural network 302 path, the differential neural network 304 path—specifically hidden layers 350 and output layer 360—is trained to encode the difference between the acoustic parameters of the target speaker and base speaker. During this adaptation phase of the training, only training sentences from a target speaker are used. In the adaptation phase, first, the differential neural network 304 path is initialized with model parameters learned during the initial training phase. Specifically, the parameters from the hidden layers 330 and the output layer 340 of the base neural network 302 are copied to the corresponding hidden layers 350 and the output layer 360 of the differential neural network 304 path. Once the differential neural network 304 is initialized, the complete network is trained setting a in the range of $0.5<\alpha<1$ and freezing the entire base neural network 302 path, only allowing updates in hidden layers 350 while output layer 360 is fixed.

After training of the acoustic model 230 is complete, the resulting output 372 of the acoustic model 230 is then a linear combination of the base neural network 302 and differential neural network 304 outputs. The precise output of the acoustic model 230 is dependent on the quantity and/or quality of the target speaker training data.

The present invention is developed for fully connected feed forward network but also applies to any non-recurrent network as well as any activation function used for hidden nodes. In addition, any optimization method used to train the base model can be used to train the adapted model. This is applicable to various types of acoustic parameters such as spectrogram, Linear Spectral Frequencies. The present invention may be used to generate and personalize any language.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, electronic circuit, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including electronic circuits such as personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. An acoustic model for a speaker adaptation text-to-speech system, wherein the acoustic model comprises:
   a base neural network comprising:
      a) a first input layer;
      b) a first plurality of hidden layers;
      c) a second plurality of hidden layers; and
      d) a first output layer;
   a differential neural network comprising:
      a) the first input layer;
      b) the first plurality of hidden layers;
      c) a third plurality of hidden layers; and
      d) a second output layer; and
   a summing circuit configured to generate a weighted linear combination from the first output layer and second output layer;
   wherein the base neural network is configured to generate acoustic parameters corresponding to a base speaker, and the differential neural network is configured to generate acoustic parameters corresponding to differences between acoustic parameters of the base speaker and a target speaker.

2. The acoustic model of claim 1, wherein the acoustic model comprises a deep neural network.

3. The acoustic model of claim 1, wherein the first input layer of the acoustic model is to receive a plurality of frame-level linguistic feature vectors, each comprising a numerical representation specifying an identity of a phoneme, a phonetic context, and a position of the phoneme within a syllable or word.

4. The acoustic model of claim 1, wherein the summing circuit is configured to output a plurality of acoustic feature vector, each acoustic feature vector comprising spectral features, a pitch feature, and band aperiodicity features.

5. The acoustic model of claim 1, wherein the summing circuit is configured to generate a weighted linear combination from the first output layer and second output layer.

6. The acoustic model of claim 5, wherein the summing circuit is configured to apply a first weight to the first output layer and second weight to the second output layer, wherein the first and second weights depend on an amount of target speaker training data used to train the differential neural network.

7. A method of generating an acoustic model for a speaker adaptation text-to-speech system, wherein the method comprises:
   training a base neural network, wherein the base neural network comprises a first input layer, a first plurality of hidden layers, a second plurality of hidden layers, and a first output layer; wherein the base neural network is configured to generate acoustic parameters corresponding to a base speaker,
   after training the base neural network, then training a differential neural network, wherein the differential neural network comprises a third plurality of hidden layers connected to the first plurality of hidden layers, and a second output layer; wherein the differential neural network is configured to generate acoustic parameters corresponding to differences between acoustic parameters of the base speaker and a target speaker; and
   generating a summing circuit for producing a weighted linear combination from the first output layer and second output layer.

* * * * *